Patented May 1, 1945

2,374,891

UNITED STATES PATENT OFFICE 2,374,891

ACYLAMINES OF THE ANTHRAQUINONE SERIES AND A PROCESS FOR THEIR MANUFACTURE

Albin Peter, Basel, Switzerland, assignor to Sandoz A. G., Fribourg, Switzerland, a firm No Drawing. Application January 16, 1942, Serial No. 427,076. In Switzerland November 6, 1940

10 Claims. (Cl. 260—276)

The present invention relates to new acylamines of the anthraquinone series which are valuable vat dyestuffs useful for dyeing different kinds of textiles and other materials and to a process for the manufacture of the new compounds.

I have found that new acylamines of the anthaquinone series can be obtained by condensing such 1-benzoylamino-4-(carboxy)-phenylaminoanthraquinones that contain a substituted or unsubstituted carboxyl group with vattable derivatives of anthraquinones which contain at least one primary amino group.

The 1-benzoylamino-4-(carboxy)-phenylaminoanthraquinones that I use in the present process can contain substituents such as halogen, cyano, alkyl, and acylamino, and the latter may be of aliphatic or of aromatic nature.

The starting products of the above cited configuration can be prepared in any known manner, for example by condensation of halogenanthraquinones with aminobenzoic acid, or by condensation of aminoanthraquinones with halogenbenzoic acids—by splitting off the sulphonic acid group from 1-amino-4-(carboxyphenyl)aminoanthraquinone-2-sulphonic acids which themselves can be obtained by condensation of 1-amino-4-halogenantharquinone-2-sulphonic acid with aminobenzoic acids and by subsequent acylation of the free amino group.

By vattable anthraquinone derivatives containing at least one primary amino group I mean those derivatives of anthraquinone that can be transformed into leuco compounds. As such derivatives that I preferably use in order to carry out my invention I cite herein the following: aminoanthraquinones, such as 1- and 2-aminoanthraquinone, 1-amino-3-bromoanthraquinone, 1-amino-5-, -6-, -7- and 8-chloroanthraquinone, 1-amino-6,7-dichloranthraquinone, 1-amino-4-, -5- and -8-hydroxyanthraquinone, 1-amino-4-methoxyanthraquinone, 1,4-, 1,5-, 1,8- and 2,6 diaminoanthraquinone, 1-amino-4-, -5- and 8-benzoylaminoanthraquinone, 1-amino-4-phenylaminoanthraquinone, 1-amino-4-(2'-chlorophenyl)-, -(3'-chlorophenyl)-, -(4'-chlorophenyl)aminoanthraquinone, 1-amino-4-(4'-methylphenyl)-, -(4'-methoxyphenyl)-aminoanthraquinone, 1-amino-4-phenylamino-6- or -7-chloranthraquinone and the derivatives which are substituted in the phenyl radical by halogen, alkyl and alkoxy; aminoanthrapyridones, such as 4-amino-N-methyl-1(N)9-anthrapyridone, 4-amino-N-methyl-C-acetyl- and -C-carbethoxyanthrapyridone, 4-amino-2-methyl-C-carbethoxy-, -C-carbomethoxy-, -C-benzoyl-, -C-acetyl-, -C-cyananthrapyridone, 5-amino-C-carboethoxy-1(N)9-anthrapyridone; aminoanthrapyrimidines, such as 4-amino-1,9-anthrapyrimidine, 5-aminoanthrapyrimidine; amino anthraquinoneacridones, such as 4-aminoanthraquinone-2,1-(N)-benzacridone, 5- and 8-aminoanthraquinone-2,1-(N)-benzacridone; aminodi- and poly-anthrimides such as the mono- and diamino-1,1'-dianthrimides, the mono- and diamino-1,2'-dianthrimides, amino- and diaminothrianthrimides, such as for example the 4-amino-1,1'- and -1,2'dianthrimide, 5-amino-1,1'-and 1,2'-dianthrimide, 4,4'-diamino-1,1'-dianthrimide, 4,5'-diamino-1,1'-dianthrimide, 5,5'-diamino-1,1'-dianthrimide, 4₁4₃-diamino-1₁1₂-5₂1₃-trianthrimide, as well as their halogenated derivatives, such as 5-amino-6'-chloro-1,1'-dianthrimide, 4,4'-diamino-6,6'-dichlor-1,1'-dianthrimide, 4-amino-6'-chlor-1,2'-dianthrimide, 4-amino-6-chlor-1,2'-dianthrimide and so on.

The condensation to the new acylamines is carried out by heating the carboxy compound in a solvent such as chlorobenzene, dichlorobenzene, trichlorobenzene, nitrobenzene with phosphorus trichloride, phosphorus pentachloride, thionyl chloride, whereby the carboxy compound becomes transformed into the carboxychloride derivative and—if desired, after separation of the acid chloride and dissolving it in a fresh quantity of a solvent—by heating it with a primary amine, if desired, in presence of acid binding compounds, such as pyridine, dimethylaniline, alkaline metal acetates and the like.

The condensation can also be carried out by heating a mixture in a solvent such as chlorobenzene, o-dichlorobenzene, trichlorobenzene, nitrobenzene in presence or absence of an acid binding agent, such as pyridine, dimethylaniline, alkalimetal acetate, and in presence of a condensing compound, such as phosphorus pentoxide, sulphuric acids, phosphorus oxychloride, phosphorus trichloride, phosphorus pentachloride, zinc chloride, aluminium chloride, iron chloride, thionyl chloride and the like. In order to carry out the condensation I generally use the thionyl chloride because of its easy use.

The temperatures at which the condensation is carried out may vary in wide limits. Generally I heat the mixtures so long, until a test taken out and dissolved in alcohol shows that the quantity of the alcohol-soluble compounds no longer decreases. After the condensation has been carried out the new acylamines are—if desired after dilution with alcohol—directly filtered off from the reaction medium. In order to purify them, sometimes it is indicated to subject them to an extraction with an appropriate solvent, such as ethanol, glacial acetic acid, o-dichlorobenzene, nitrobenzene, aniline, diluted soda water to which, if desired, a certain amount of sodium hypochlorite has been added.

The new acylamines obtained by the present process are valuable vat dyestuffs yielding level dyeings of excellent stability to chlorine and to soda boiling. They can also be used as starting products for the preparation of other dyestuffs.

The following examples, without being limita-

Example 1

10 parts of 1-benzoylamino-4-(4'-carboxy) phenylaminoanthraquinone are treated during 1 hour at 120° C. with 4 parts of thionyl chloride in 100 parts of dry nitrobenzene. After distilling off the excess of thionyl chloride in a dry air stream, 7.4 parts of 1-amino-5-benzoylaminoanthraquinone are added to the solution and the whole is stirred during 1 hour at 130–140° C. The condensation product which precipitates is then filtered still warm and washed with nitrobenzene, ethanol and water. A dyestuff dyeing cotton fast olive shades from a dark blue-red vat is obtained. The new compound possesses the formula:

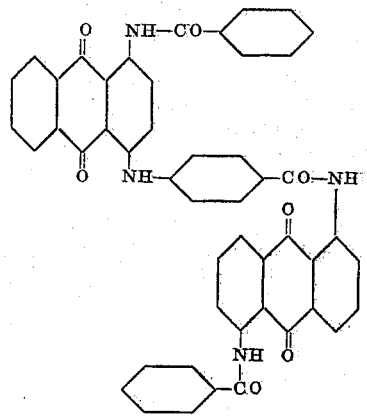

A similar dyestuff will be obtained when 1-benzoylamino-4(2'-carboxy)phenylamioanthraquinone is used as acylating agent.

Example 2

50 parts of 1-benzoylamino-4(4'-carboxy) phenylaminoanthraquinone are treated during 1 hour at 130° C. in 1000 parts of nitrobenzene with 50 parts of thionyl chloride. The excess of thionyl chloride is separated by means of a stream of dry air and the solution allowed to crystallize. The precipitated acid chloride is filtered, washed with benzene and dried.

10 parts of this acid chloride are introduced into a mixture consisting of 200 parts of dichlorobenzene, of 6.7 parts of 1-amino-4-phenylaminoanthraquinone and of 2 parts of pyridine and the charge is stirred at 140° C. until a test taken out and dissolved in ethanol dyes the solvent only very pale. The reaction mixture is then diluted with ethanol at 80° C. and filtered. The new dyestuff dyes cotton grey shades, fast to bleaching from a dark blue-red vat and possesses the following formula:

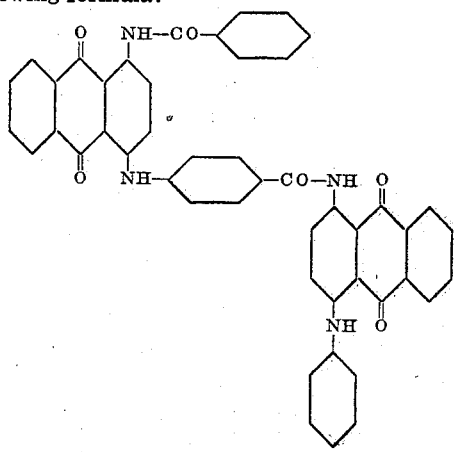

Example 3

10 parts of 1-benzoylamino-4(4'-carboxy)-phenylaminoanthraquinone are treated in 100 parts of o-dichlorobenzene during 1 hour at 120° C. with 5 parts of thionyl chloride. The excess of thionyl chloride is then distilled off and 2 parts of pyridine and 6.8 parts of 1-amino-4-phenylaminoanthraquinone are added to the charge, which is then stirred during 1 hour at 130–140° C. The dyestuff thus obtained is worked up in the same manner as described in Example 2 and is also identical with the dyestuff of this example.

Similar reddish to greenish-grey dyestuffs are obtained if instead of the phenyl derivative 1-amino-4-(2'-chlorophenyl)-, -(3'-chlorophenyl)-, -(4'-chlorophenyl)-, -(2'-methylphenyl)-, -(3'-methylphenyl)-, or -(4'-methylphenyl)-aminoanthraquinone is used.

Example 4

8 parts of 1-benzoylamino-4(3'-carboxy)phenylamino-anthraquinone, 5.4 parts of 1-amino-4-phenylaminoanthraquinone, 200 parts of o-dichlorobenzene and 10 parts of pyridine are stirred at 80° C. and treated with 3 parts of thionyl chloride. The temperature is then increased to 140° C. and the charge stirred so long, until a test in alcohol shows no more change of the weak bluish shade. Then 0.5 part of thionyl chloride is added thereto, stirred 1 hour longer and a test in alcohol is taken out again. This treatment is repeated until after a new addition of thionyl chloride no decrease of 1-amino-4-phenylaminoanthraquinone can be found.

The new dyestuff is worked up in the usual manner; it dyes cotton reddish-blue shades from a dark blue-red vat and possesses the following formula:

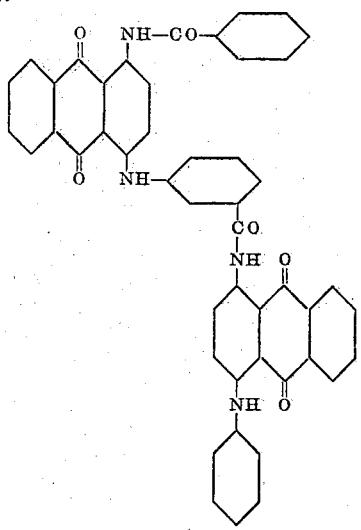

By using 1-amino-4-phenylamino-6-chloroanthraquinone instead of 1-amino-4-phenylaminoanthraquinone a dyestuff possessing a bluer shade will be obtained.

Example 5

7.9 parts of 1-benzoylamino-4-(4'-carboxy)-phenylaminoanthraquinone are heated under stirring with 3.9 parts of 4,4'-diamino-1,1'-dianthrimide and 200 parts of dichloro benzene. At 100° C. 3.2 parts of thionyl chloride are added thereto and the temperature is increased up to 175° C. After heating for 12 hours the reaction mixture is allowed to cool down, diluted with ethanol and the precipitated dyestuff filtered. It dyes cotton from a dark-red vat a level olive-black shade with excellent fastness to light, bleaching and soda boiling. It possesses the following formula:

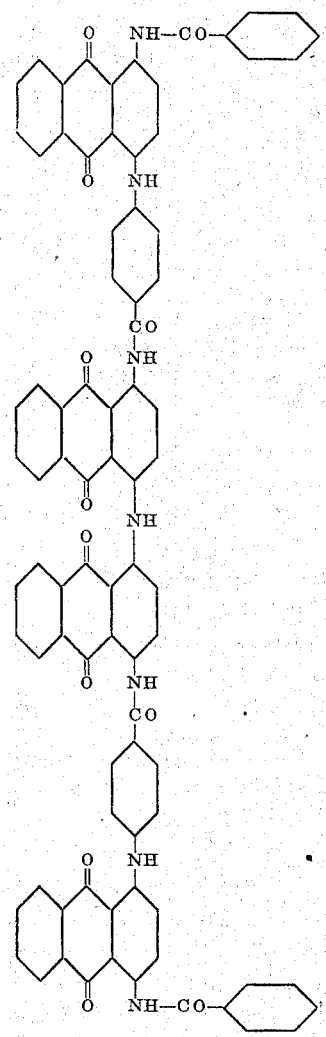

By using 4.5 parts of 4,4'-diamino-6,6'-dichloro 1,1'-dianthrimide instead of the 4,4'-diamino-1,1-dianthrimide, a grey-black dyestuff will be obtained.

Example 6

7.9 parts of 1-benzoylamino-4-(3'-carboxy)-phenylaminoanthraquinone are stirred at 200° C. in 200 parts of trichlorobenzene with 3.9 parts of 4,4'-diamino-1,1'-dianthrimide. A solution of 4 parts of thionyl chloride in 10 parts of trichlorobenzene is allowed to run in within one hour and the charge is stirred for several hours at 200° C. The dyestuff isolated in the usual manner dyes cotton and rayon strong blue-grey shades from a dark-red vat and possesses the formula:

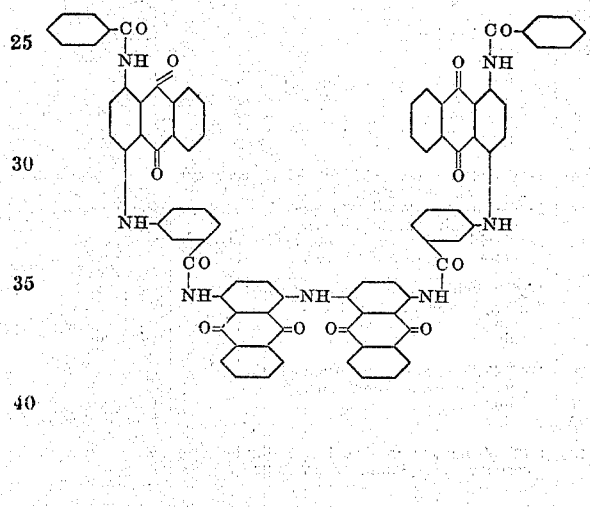

The following table relates to further examples:

| | Acylating agent | Primary amine | Color of the vat | Dyeing on cotton |
|---|---|---|---|---|
| 7 | 1-benzoylamino-4-(2'-carboxyphenyl)-aminoanthraquinone. | 1-amino-4-phenyl aminoanthraquinone. | Dark blue-red | Blue-grey. |
| 8 | do | 1-amino-4-(4'-chlorophenyl)-aminoanthraquinone. | Reddish-black brown. | Do. |
| 9 | do | 1-amino-5-benzoylamino-anthraquinone. | Dark-blue-red | Olive. |
| 10 | do | 4-amino-N-methyl-anthrapyridone. | Red-brown | Corinth. |
| 11 | do | 4-amino-2-methyl-C-carbethoxy-anthrapyridone. | Dark-red | Reddish-grey. |
| 12 | 1-benzoylamino-4-(3'-carboxyphenyl)-aminoanthraquinone. | 1-amino-5-benzoylamino-anthraquinone. | Dark-blue-red | Black-olive. |
| 13 | do | 1-5,diaminoanthraquinone. | do | Reddish-grey. |
| 14 | do | 1-amino-4-phenylaminoanthraquinone. | do | Reddish-blue. |
| 15 | do | 1-amino-4-(3'-chlorophenyl)-aminoanthraquinone. | do | Blue-violet. |
| 16 | do | 1-amino-4-(4'-chlorophenyl)-aminoanthraquinone. | do | Do. |
| 17 | do | 1-amino-4-(4'-methoxyphenyl)-aminoanthraquinone. | do | Navy-blue. |
| 18 | do | 1-amino-4-(4'-diphenyl)-aminoanthra-quinone. | do | Do. |
| 19 | do | 4-amino-N-methyl-anthra-pyridone. | Dark-yellow-red | Violet-black. |
| 20 | do | 4-amino-anthra-pyrimidine. | Dark-blue-red | Blue-grey. |
| 21 | do | 1-amino-4-methoxyanthra-quinone. | Dark-red | Corinth. |
| 22 | do | 1,4-diamino-anthraquinone. | Dark-blue-red | Dull-violet. |
| 23 | do | 1-amino-4-benzoylamino-anthraquinone. | do | Corinth. |
| 24 | do | 4-amino-2-methyl-C-carbethoxy-anthrapyridone. | Red-brown | Grey. |
| 25 | do | 1-amino-4-phenylamino-6-chloro-anthraquinone. | Dark-red | Blue. |
| 26 | do | 4-amino-anthra-quinone-2,1-(N)-benzacridone. | Dark-blue-red | Blue. |
| 27 | do | 4-amino-anthra-quinone-2,1-(N)-(4'-chloro)-benzacridone. | do | Do. |
| 28 | do | 5-aminoanthra-quinone-2,1-(N)-benzacridone. | Blue-violet | Corinth. |
| 29 | do | 8-aminoanthraquinone-2,1-(N)-benzacridone. | Dark-blue-red | Do. |
| 30 | 1-benzoylamino-4-(3'-carboxy-4'-chlorophenyl)-aminoanthraquinone. | 1,4-diamino-anthraquinone. | Dark-red | Dull-blue-violet. |
| 31 | do | 1-amino-4-(4'-chloro-phenyl)-amino-anthraquinone. | Dark-blue-red | Blue-violet. |
| 32 | do | 1,5-diamino-anthraquinone. | Dark-red | Reddish-grey. |

| | Acylating agent | Primary amine | Color of the vat | Dyeing on cotton |
|---|---|---|---|---|
| 33 | 1-(2'-chloro)-benzoylamino-4-(3'-carboxy-4'-chlorophenyl)-aminoanthraquinone. | Diamino-anthra-rufine | Dark-yellow-red | Violet. |
| 34 | ....do.... | 4-amino-N-methyl-anthrapyridone | Dark-red | Brownish-black-violet. |
| 35 | 1-benzoylamino-4-(4'-carboxy) phenyl-amino-anthraquinone. | 1-aminoanthraquinone | Dark-blue-red | Olive. |
| 36 | ....do.... | 2-aminoanthraquinone | Dark-yellow-red | Greenish-grey. |
| 37 | ....do.... | 1-amino-3-bromo-anthraquinone | Dark-blue-red | Grey. |
| 38 | ....do.... | 1-amino-4-hydroxy-anthraquinone | ....do.... | Black-violet. |
| 39 | ....do.... | 1-amino-4-methoxy-anthraquinone | ....do.... | Do. |
| 40 | ....do.... | 1,4-diamino-anthraquinone | ....do.... | Reddish-grey. |
| 41 | ....do.... | 1-amino-4-benzoylaminoanthraquinone | ....do.... | Black-violet. |
| 42 | ....do.... | 1-amino-4-phenyl-amino-anthraquinone | ....do.... | Grey. |
| 43 | ....do.... | 1-amino-5-chloro-anthraquinone | ....do.... | Reddish-grey. |
| 44 | ....do.... | 1-amino-5-hydroxyanthraquinone | ....do.... | Greenish-grey. |
| 45 | ....do.... | 1,5-diamino-anthraquinone | ....do.... | Black-brown. |
| 46 | ....do.... | 1-amino-5-benzoylamino-anthraquinone | ....do.... | Olive. |
| 47 | ....do.... | 1-amino-5-phenylamino-anthraquinone | ....do.... | Reddish-grey. |
| 48 | ....do.... | 1-amino-8-chloro-anthraquinone | ....do.... | Black-olive. |
| 49 | ....do.... | 1-amino-8-hydroxyanthraquinone | ....do.... | Olive. |
| 50 | ....do.... | 1,8-diaminoanthraquinone | ....do.... | Reddish-black-brown. |
| 51 | ....do.... | 4-amino-anthraquinone-2,1-benzacridone | ....do.... | Blue-grey. |
| 52 | ....do.... | 4-amino-N-methyl-anthrapyridone | ....do.... | Dark-brown. |
| 53 | ....do.... | 4-amino-N-methyl-C-acetyl-anthrapyridone | ....do.... | Do. |
| 54 | ....do.... | 4-amino-2-methyl-C-carbethoxy-anthrapyridone | Dark-red | Black-brown. |
| 55 | ....do.... | 4-amino-anthra-pyrimidine | Dark-blue-red | Olive. |
| 56 | ....do.... | 1-amino-4-(3'-chloro)-phenyl-aminoanthraquinone | ....do.... | Reddish-grey. |
| 57 | ....do.... | 1-amino-4-(4'-chloro)-phenyl-aminoanthraquinone | ....do.... | Grey. |
| 58 | ....do.... | 1-amino-4-(2',5'-di-chloro)-phenyl-amino-anthraquinone | ....do.... | Reddish-grey. |
| 59 | ....do.... | 1-amino-6-chloro-anthraquinone | ....do.... | Olive-grey. |
| 60 | ....do.... | 1-amino-4-bromo-anthraquinone | Dark-red | Do. |
| 61 | ....do.... | 1-amino-4-(2'-chloro)-phenyl-aminoanthraquinone | Dark-blue-red | Grey. |
| 62 | ....do.... | 1-amino-4-phenyl-amino-6-chloro-anthraquinone | Dark-red | Do. |
| 63 | 1-(4'-methoxy)-benzoylamino-4-(4'-carboxy) phenylaminoanthraquinone. | 1-amino-4-(2'-methoxyphenyl)-aminoanthraquinone | Dark-blue-red | Black-green. |
| 64 | 1-(4'-nitro)-benzoylamino-4-(4'-carboxy) phenylaminoanthraquinone. | 1-amino-4-phenylaminoanthraquinone | ....do.... | Do. |
| 65 | 1-(2'-chloro)-benzoylamino-4-(4'-carboxy) phenylaminoanthraquinone. | ....do.... | ....do.... | Reddish grey. |
| 66 | ....do.... | 4-amino-N-methylanthrapyridone | ....do.... | Dark-brown. |
| 67 | 1-(2',4'-dichloro-) benzoylamino-4-(4'-carboxy) phenylaminoanthraquinone. | 1-amino-4-methoxy-anthraquinone | Dark-red | Reddish-black-brown. |
| 68 | ....do.... | 1-amino-4-phenylaminoanthraquinone | Dark-blue-red | Grey. |
| 69 | ....do.... | 1-amino-4-(4'-chloro) phenylaminoanthraquinone | ....do.... | Do. |
| 70 | 1-(2',4'-dichloro)-benzoylamino-4 (4'-carboxy) phenylaminoanthraquinone. | 1-amino-6,7-dichloro-anthraquinone | Dark-red | Black-brown. |
| 71 | ....do.... | 4-amino-N-methylanthraquinone | ....do.... | Dark-brown. |
| 72 | ....do.... | 4-amino-2-methyl-C-carbethoxy-anthrapyridone | ....do.... | Do. |
| 73 | 1-(2',5'-dichloroterephthaloyl-) amino-4 (4'-carboxy)-phenylaminoanthraquinone. | 1-amino-4-phenylaminoanthraquinone | Dark-blue-red | Grey. |
| 74 | ....do.... | 1-amino-4-(4'-chloro-phenyl)-aminoanthraquinone | ....do.... | Greenish-grey. |
| 75 | 1-benzoylamino-4-(4' carboxy-2'-methyl-phenyl)-aminoanthraquinone. | 1-amino-4-phenyl-aminoanthraquinone | ....do.... | Do. |
| 76 | ....do.... | 4-amino-N-methyl-anthrapyridone | ....do.... | Black-brown. |
| 77 | 1-benzoylamino-4-(3'-carboxy) phenyl-aminoanthraquinone. | 4-amino-1,1'-dianthrimide | Dark red | Dull violet. |
| 78 | 1-benzoylamino-4-(4'-carboxy)-phenyl-aminoanthraquinone. | 4,5'-diamino-1,1'-dianthrimide | Dark-red-brown | Reddish-grey. |
| 79 | ....do.... | 4-amino-1,1'-dianthrimide | Dark-red | Black-violet. |
| 80 | ....do.... | 4-amino-1,2'-dianthrimide | Bordeaux-red | Do. |
| 81 | ....do.... | 5-amino-1,1'-dianthrimide | Dark-red | Brown-violet. |
| 82 | ....do.... | 5-amino-6'-chloro-1,1'-dianthrimide | Red-brown | Reddish-grey. |
| 83 | ....do.... | 5-amino-1,2'-dianthrimide | Dark-red | Brown-violet. |
| 84 | ....do.... | 5,5'-diamino-1,1'-dianthrimide | Bordeaux-red | Do. |

What I claim is:

1. A process for the manufacture of dyestuffs or dyestuff intermediates, comprising the step of condensing an anthraquinone compound of the general formula

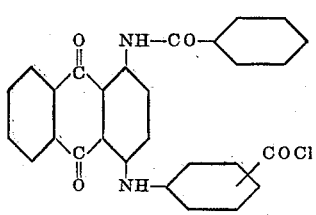

with a vattable anthraquinone compound containing at least one primary amino group, by heating the said compounds in the presence of an organic solvent comprising an acid acceptor.

2. A process for the manufacture of dyestuffs or dyestuff intermediates, comprising the step of condensing an anthraquinone compound of the general formula

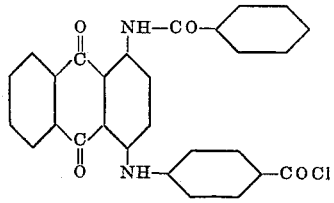

with a vattable anthraquinone compound containing at least one primary amino group, by heating the said compounds in the presence of an organic solvent comprising an acid acceptor.

3. A process for the manufacture of a dyestuff, comprising the step of heating the anthraquinone compound of the formula

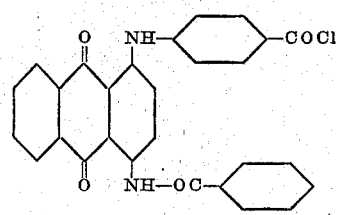

with 4-aminoanthraquinone-2:1(N)-benzolacridone in the presence of an organic solvent comprising an acid acceptor.

4. A process for the manufacture of a dyestuff, comprising the step of heating the anthraquinone compound of the formula

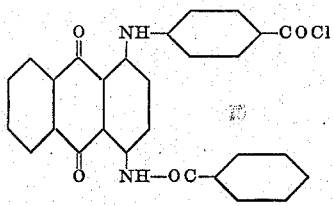

with 1-amino-4-phenylaminoanthraquinone in the presence of an organic solvent comprising an acid acceptor.

5. A process for the manufacture of a dyestuff, comprising the step of heating the anthraquinone compound of the formula

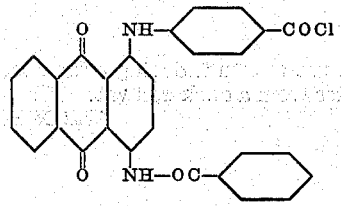

with 4:4'-diamino-1:1'-dianthrimide in the presence of an organic solvent comprising an acid acceptor.

6. The compounds of the formula

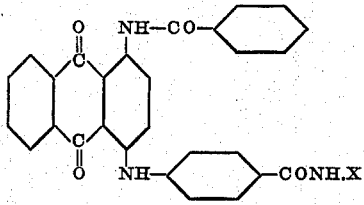

wherein X represents the radical of a vattable anthraquinone compound, which compounds are vattable compounds possessing affinity for fibers of cellulosic nature and which can be used as vat dyestuffs and as intermediate products for the manufacture of dyestuffs.

7. The compounds of the formula

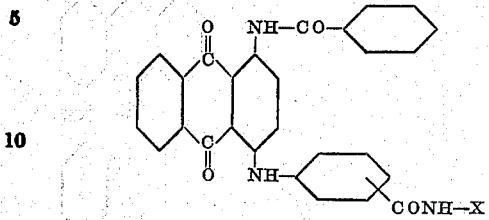

wherein X represents the radical of a vattable anthraquinone compound, which compounds are vattable compounds possessing affinity for fibers of cellulosic nature and which can be used as vat dyestuffs and as intermediate products for the manufacture of dyestuffs.

8. The compound of the formula

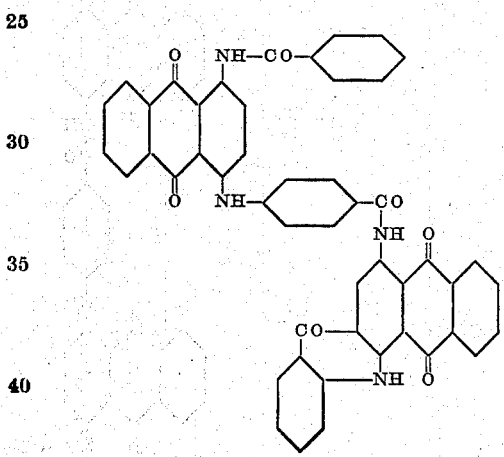

which is a vat dyestuff, dyeing cotton blue-grey shades from a dark-blue-red vat.

9. The compound of the formula

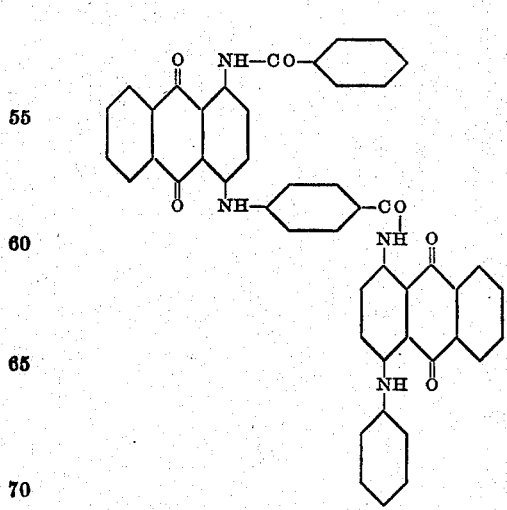

which is a vat dyestuff, dyeing cotton grey shades from a dark-blue-red vat.

10. The compound of the formula
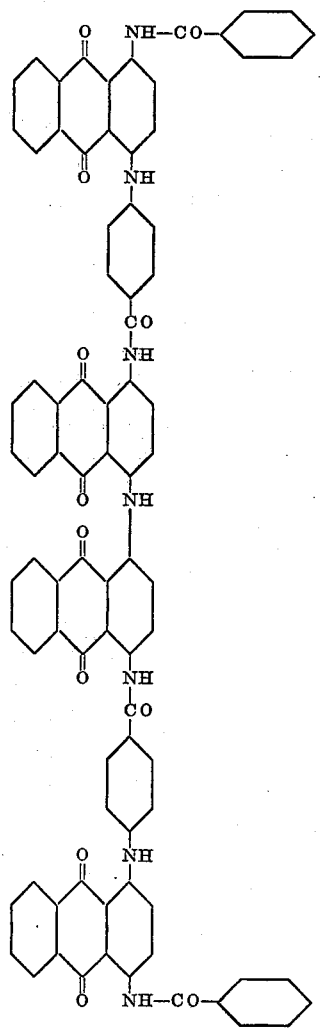
which is a vat dyestuff, dyeing cotton level olive-black shades from a dark-red vat.
ALBIN PETER.